April 6, 1954  F. F. CRANDELL  2,674,154
PHOTOMETRIC DEVICE
Filed May 21, 1949
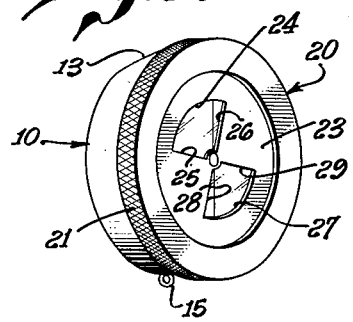
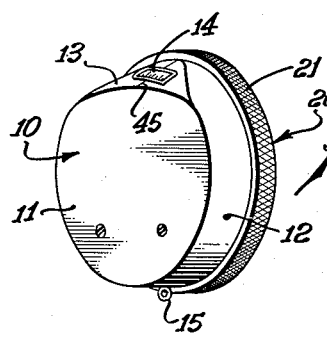
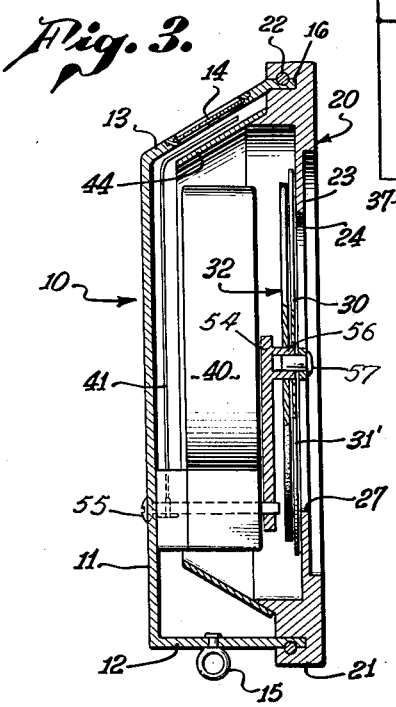
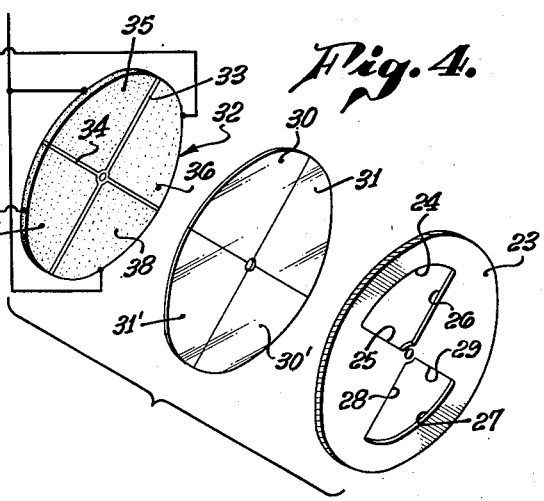
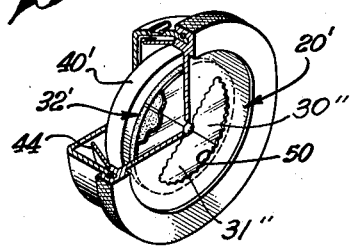
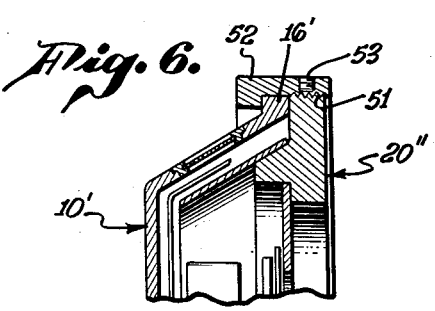
FRANK F. CRANDELL,
INVENTOR.
BY
ATTORNEY.

Patented Apr. 6, 1954

2,674,154

UNITED STATES PATENT OFFICE 2,674,154

PHOTOMETRIC DEVICE

Frank F. Crandell, Pasadena, Calif., assignor to Photo Research Corporation, San Fernando, Calif., a corporation of California Application May 21, 1949, Serial No. 94,719

10 Claims. (Cl. 88—22.5)

This invention relates to a photometric device and is particularly directed to a simple, inexpensive, portable, light weight and compact device for rapidly and accurately determining color temperature of light or correction filters which should be employed during photography for the purpose of modifying the light reaching a photographic film in order to permit accurate color rendition of the subject being photographed.

The invention, moreover, is directed to an arrangement of elements whereby a single photoelectric cell is employed for the purpose of simultaneously generating different output currents.

In addition, the invention contemplates means whereby the accuracy of the instrument is increased, self-compensating features being embodied in the instrument so that light reaching the cell or cell sections at angles deviating from the normal will not produce appreciable errors.

Although the device of this invention may be utilized in many problems and determinations relating to the general subject of photometry or illumination engineering, it is particularly adapted for use in the photographic arts.

In order to obtain an accurate photographic rendition of a subject, it is very important that the photographer should be able to measure the amount or aggregate of light under which the subject is exposed and when color-sensitive film is used it becomes necessary to know the particular color characteristics of the light source. Light which has the same intensity may vary widely in its color temperature or spectral composition.

The color temperature of light is usually measured in degrees Kelvin, which is a measure of the temperature to which a "black body" must be raised to have the same color as the light in question. Color-sensitive film is made for use under light of a particular color temperature range, and true color rendition can only be obtained when the light employed is of the desired color temperature. Once the color temperature of the light source is determined, a photographer may then select a specific color-sensitive film which will match the temperature of the light, or he may compensate for the variation between the color temperature of the light source and the color temperature for which the film is designed by the use of selected filters, by supplementing the light source with light modifying the characteristics of the initial light source, or by modifying the voltage of the light source being used.

A color temperature meter employing a single photocell is described in copending application, Serial No. 49,706, filed September 17, 1948, by Frank F. Crandell and Herman Heidt, now Patent 2,587,601, issued March 4, 1952. The present invention may be termed to be an improvement on the direct-reading color temperature meter there described, in that readings are obtained with greater facility and although a single cell is employed, the light impinging upon such cell is modified by two light filters simultaneously.

It is an object of the present invention, therefore, to disclose and describe a simple and effective direct-reading photometric instrument particularly adapted to facilitate the determination of color temperature of light, the characteristics of a film to be used with a given source of light, or the character of compensating filters to be employed with light of a determined characteristic and a film of known sensitivity. These and other objects of the invention will become apparent to those skilled in the art from the following detailed description of exemplary forms, reference being had to the appended drawings, in which:

Fig. 1 is a perspective front view of a device constructed in accordance with the present invention;

Fig. 2 is a perspective rear or back view of the device;

Fig. 3 is a vertical transverse section through the device;

Fig. 4 is a partly diagrammatic exploded view of certain elements employed in constructing the device;

Fig. 5 is a three-quarter perspective view, partly broken away, of a modified form of the device, and Fig. 6 is an enlarged transverse section of a portion of the device illustrating a modified form of construction which may be employed.

The device illustrated in Figs. 1 to 4, inclusive is particularly adapted for use by illumination engineers and may be carried upon a suitable neck cord and is of a sufficiently small size to permit its use as a vest pocket instrument.

Generally stated, the device consists of a rear housing 10, including the back wall 11 and a substantially cylindrical side wall 12; this side wall being deformed at the upper end so as to assume a plane or conical form 13 provided with a window 14. An eyelet 15 may be carried by the wall 12 of the housing for attachment to a neck cord.

The lip 16 of this rear housing is of cylindrical form and rotatably mounted thereon is a shutter member 20 having knurled or serrated outer edge 21. The shutter member 20 is provided with a circular recess into which the lip 16 is slidably received. One wall of such recess and the opposing surface of the lip 16 may be grooved for the purpose of receiving a malleable, preferably leaded length of bearing wire 22 which may be inserted into the grooves through a tangential opening formed in the lip of member 20, the wire or member 22 acting both to retain the shutter member 20 in position upon the housing and at the same time providing a bearing.

The shutter member 20 carries a frontal plate 23 provided with two oppositely disposed openings extending from a central point or area, one of these openings, generally indicated at 24, being delineated by the radial margins 25 and 26, whereas the other opening 27 is delineated by the radial margins 28 and 29. The imperforate, opaque sectors between margins 25 and 28 and margins 26 and 29, respectively, constitute two oppositely disposed shutters movable simultaneously with the ring-like outer shutter member 20.

These shutters overlie four color filter sectors, each of said sectors being approximately 90 degrees at its central apex. Preferably, but not necessarily, two of these filters are capable of transmitting longer lengths of wavelight, whereas the intermediate filters transmit shorter lengths of wavelight. For example, filters 30 and 30' may transmit blue light, whereas filters 31 and 31' transmit red light.

Beneath the color filters is a suitable photoelectric cell which may be of the photronic barrier-layer type generally indicated at 32. The barrier-layer of this single cell is interrupted by two intersecting score lines or channels at right angles to each other. Such channels being indicated at 33 and 34, thereby subdividing the cell into four sections indicated at 35, 36, 37 and 38.

Mounted within the housing 10 and preferably carried by the rear wall 11, as by means of suitable screws, is a microammeter or other form of galvanometer 40 provided with a needle 41, the end of such needle being bent so as to move immediately beneath the window 14 of the housing. Oppositely disposed portions of cell 32, such as the portions 35 and 38, are connected to one terminal of the meter 40, whereas the other oppositely disposed portions of the cell, such as 36 and 37 are connected to the other terminal of the meter, as best illustrated in Fig. 4.

The shutter color filters and cell 32 are in closely adjacent parallel planes and the cell and color filters are suitably held in such position as by a bracket 54 secured at its lower end to a galvanometer mounting screw 55 and provided with a sleeve 56 upon which the cell 32 and filters may be fixedly mounted. The sleeve may be journaled over the pin 57 carried by the shutter 20. It is important to maintain as little clearance between the cell, color filters and movable shutter as possible.

Carried by the movable shutter 20 is a conical member 44 extending beneath the window 14 of the rear housing, the included angle of the cone should be substantially set to the angle of the deformed area 13. In most instances the deformed area is preferably at an angle of between about 30 degrees and 45 degrees to the central axis about which the shutter member 20 revolves. The outer surface of this conical member 44 is suitably calibrated and carries either one or two scales, one may be calibrated in degrees Kelvin, while the other may be calibrated in terms of "correction filters" to be employed for one or more given types of film.

These various scales may occupy the same arc on the outer surface of the scale member 44, or they may be carried on diametrically opposed areas of the scale member 44 so that either one or another of the scales may be brought into visual observation through the window 14.

It will be noted that by reason of the arrangement employed the shutter member 20 can be adjusted so that the response of cells to light modulated by one type of filter is counterbalanced by the response generated by cell portions exposed to light modulated by the other filter. In other words, the index or needle 41 may be caused to assume a zero or null position; the response of cell sections 35 and 38 being opposed by the response of cell sections 36 and 37. Such desired null position exists when the index 41 is in alignment with a scribe line or reference line 45 traversing the window 14 or adjacent areas of the deformed wall portions 13 of the housing. (See Fig. 2.) The color temperature of the light reaching cell 32 can then be read directly from the indicia carried by the scale member 44, since this scale member rotates with and is a part of the shutter member 20.

Attention is also called to the fact that in event the light passing through the shutter openings is not at right angles to the plane of the surface of cell 32, but instead is inclined thereto, the reading will not be dropped or varied to any material or appreciable extent. If, for example, light is passing through the shutter openings from the left it will be apparent that some light can get under the edge 26 and therefore more light will pass through the red filter than in the event the light is more normal and at right angles to the cell. However, any increase in the amount of light passing beneath the edge 26 is compensated for by the reduction in the amount of light passing the edge 28 and the red filter underlying such edge.

This self-compensating feature of the device is extremely important since it eliminates the necessity for very carefully pointing the instrument directly at the light being tested. Attention is also called to the fact that by providing the window 14 at an angle to the axis, the operator need not look toward the light being tested and his vision is thus not impaired.

Fig. 5 shows a somewhat amplified form of device wherein the cell 32' is divided into two sections, only one of the sections being covered with a red filter 31'' and the other with a blue filter 30'', these two sections being then connected to opposing terminals of the microammeter.

The shutter member 20' is provided with a semi-circular aperture or opening having a serrated edge 50. The shutter member 20' carries an inner conical indicia member such as 44 in the previous embodiment, the scale on such member 44 cooperating with a window and the index member of the microammeter. The form of device illustrated in Fig. 5 operates in substantially the same manner, but has to be accurately directed toward the light being tested since it does not have the self-compensating features previously described in connection with the first embodiment.

It may be noted that the edges 25, 26, 28 and 29 of the openings 24 and 27 of the shutter member 20 may also be serrated in the manner illustrated in Fig. 5 for the purpose of imparting greater accuracy to the readings.

Fig. 6 illustrates a form of construction which may be employed in any of the devices herein disclosed. As there shown, the rear housing 10' terminates in a cylindrical lip portion 16', whereas the shutter member 20" is provided with an externally threaded surface 51. A flanged outer ring 52 engages the lip 16' and is threaded on to the threaded edge 51 of the shutter member so as to slidably grasp the lip 16' of the housing. A small setscrew 53 may be used to hold the flanged ring 52 in fixed position with respect to the shutter member 20" after the device is assembled.

Although, for purposes of simplification, reference has been made to filters and cell portions of equal area, each including 90 degrees, as illustrated in Fig. 4, it is not necessary that the red and blue filter areas be of equal size. Depending upon the transmission characteristics of the filters employed, the red and blue filters may vary in relative size.

All changes and modifications coming within the scope of the appended claims are embraced thereby.

I claim:

1. A compact, direct-reading photometric device comprising: a rear housing including a back wall and forwardly directed side wall portions terminating in a circular lip lying in a plane parallel to the back wall, a section of the side wall being inclined to the back wall and lip and provided with a window port; a single shutter member engaging said circular lip for rotation thereon, said shutter member being provided with an opening of fixed area eccentrically disposed with respect to the axis of rotation; a conical scale member carried by the shutter member and extending beneath the window port, indices carried by the scale member for visual observation through the window port; and a stationary, light-responsive means within the housing including a response-indicating meter provided with an index extending between the window port and scale member, said light-responsive means including at least two cell and filter assemblies, said cells being connected in opposed relation, each filter covering a cell, said filters being capable of transmitting selected spaced wave length bands of light, the area of a cell and filter assembly being virtually equal to the area of said shutter opening, one cell and filter assembly being adapted to be fully exposed when the shutter opening is aligned with said assembly, said cell and filter assemblies being so arranged for simultaneous partial exposure as said shutter opening is moved thereacross for measuring the ratio of energy in the wave length bands of light transmitted by the filters.

2. A compact, direct reading photometric device comprising: a rear housing including a back wall and forwardly directed side wall portions, a section of the side wall being inclined to the back wall and provided with a window port; circular edge margins provided on said side wall portions; a shutter member engaging said circular edge margins for rotation thereon and extending between said side wall portions, said shutter member being provided with a sector-like opening; a stationary light-responsive assembly within the housing including a plurality of contiguous sector-like cells and a response indicating meter provided with an index, adjacent cells being connected to the meter in opposing relation to give a null reading; a plurality of sector-shaped light filters, each being capable of transmitting a different wave length band and covering a respective cell; said shutter member being rotatable to cause the sector-like opening to simultaneously traverse adjacent filters and cells covered thereby in exposure varying relation; said cells, light filters, and sector-like openings lying in closely adjacent parallel planes and each being of virtually the same sector shape; and a scale member carried by and rotatable with the shutter member in visually observable relation to the window port, said index extending between the window port and scale member.

3. In a compact, portable photometric device including a housing provided with a window, a scale and a movable index beneath the window, and a meter operably connected to the index, the provision of: a light-responsive means operably connected to the meter and including a plurality of sector-shaped cells arranged in circular sequence; a plurality of light filters, each covering the entire area of a respective cell, adjacent light filters being capable of transmitting different wave length bands; adjacent cells of said light-responsive means being connected in opposing relation; and a shutter means mounted for rotation and comprising a wall provided with means for admitting light to said light-responsive means through said filters, said light-admitting means having fixed non-variable open area of virtually the same area and shape as two noncontiguous cells and associated filters and adapted to traverse simultaneously said cells and associated filters in complementary exposure varying relation upon rotation of said shutter means.

4. A device as defined in claim 3 wherein said light-admitting means in said shutter means is virtually equivalent in area to the total area of two of said cells.

5. A device as defined in claim 3 wherein said light-admitting means in said shutter means includes diametrically opposed openings, each of equal area.

6. A device as defined in claim 3 wherein said light-admitting means in said shutter means includes spaced openings, each disposed to normally cooperate with a cell and associated filter of different wave length transmission than the cell and associated filter cooperating with the adjacent opening.

7. In a compact, portable photometric device including a housing provided with a window, a scale and a movable index beneath the window, and a meter cooperating with the index, the provision of: light responsive means operably connected to the meter and including a plurality of cells of virtually equal area sequentially arranged; a plurality of light filters, each covering a respective cell and equivalent in area therewith, alternate light filters being capable of transmitting the same wave length bands and adjacent light filters different wave length bands; adjacent cells of light-responsive means being connected in opposed relation; and shutter means relatively movable with respect to said light-responsive means and filters, said shutter means including a wall provided with light-admitting means equivalent in area to the area of at least one cell and arranged to admit light to the entire area of a cell in one position, said light-admitting means being adapted upon movement of the shutter means to simultaneously traverse adjacent cells in exposure varying relation.

8. A compact direct reading photometric device comprising: a housing including a back wall and forwardly directed side wall portions terminating in a circular lip lying in a plane parallel to the back wall, a section of the side wall being inclined to the back wall and lip and provided with a window port; a single shutter member engaging said circular lip for rotation thereon, said shutter member being provided with two opposing sector-like openings of fixed area; a stationary light-responsive assembly within the housing including two pairs of sector-like cells, each cell corresponding in shape to said sector-like openings; and a response-indicating meter provided with an index, each pair of cells being connected to the meter in opposing relation to give a null reading; and a pair of light filters having different spectral transmission for each pair of cells, said shutter member being selectively positionable to simultaneously vary the exposure relationship of each pair of filters and cells; said cells, light filters and shutter lying in closely adjacent parallel planes; and a scale member carried by the shutter member in virtually observable relation to the window port, said meter index extending between the window port and scale member.

9. A photometric device of the character stated in claim 8 wherein the area occupied by one of said filters is substantially equal to the area occupied by the other of said filters each area being substantially equal to the area of a sector-like opening in the shutter and to the area of a cell beneath the filter.

10. A photometric device of the character stated in claim 8 wherein the number of cells is twice the number of openings in the shutter member, each cell being covered by a light filter, said filters occupying adjacent areas of a common plane and arranged in a circularly arranged sequence.

References Cited in the file of this patent

UNITED STATES PATENTS

| Number | Name | Date |
|---|---|---|
| 1,895,385 | Townsend et al. | Jan. 24, 1933 |
| 2,185,690 | Lane | Jan. 2, 1940 |
| 2,203,036 | Briessen et al. | June 4, 1940 |
| 2,297,428 | Nuchterlein | Sept. 29, 1942 |
| 2,298,667 | Weymouth | Oct. 13, 1942 |
| 2,307,504 | Hastings | Jan. 5, 1943 |
| 2,308,095 | Meeder | Jan. 12, 1943 |
| 2,319,212 | Cooley | May 18, 1943 |
| 2,330,877 | Fleischer et al. | Oct. 5, 1943 |
| 2,455,116 | Gittus | Nov. 30, 1948 |
| 2,462,823 | Woodward | Feb. 22, 1949 |
| 2,482,281 | Lingel | Sept. 20, 1949 |

FOREIGN PATENTS

| Number | Country | Date |
|---|---|---|
| 508,802 | Great Britain | July 5, 1939 |
| 925,985 | France | Apr. 14, 1947 |

OTHER REFERENCES

"Journal of Scientific Instruments," vol. 6, December 1929, pages 374 through 379. Publ. Cambridge University Press, London.

"Electronics," March 1937, pages 28, 29, article by Richter.